April 12, 1938.　　　　R. HOLDING　　　　2,114,107

REEL SEAT

Filed Feb. 26, 1935

Inventor
Robert Holding
Homer H. Sweet
By
Attorney

Patented Apr. 12, 1938

2,114,107

UNITED STATES PATENT OFFICE 2,114,107

REEL SEAT

Robert Holding, Denver, Colo., assignor to Goodwin Granger Company, Denver, Colo., a corporation of Colorado Application February 26, 1935, Serial No. 8,237

1 Claim. (Cl. 43—22)

This invention relates to reel seats for fishing rods and has as an object to provide an improved reel seat adapted for incorporation in a fishing rod construction.

A further object of the invention is to provide an improved reel seat whereon conventional reels may be readily mounted and firmly secured in place.

A further object of the invention is to provide an improved reel seat readily adjustable to receive and securely hold reel bases of different sizes.

A further object of the invention is to provide an improved reel seat readily adaptable to various specific types of fishing rods.

A further object of the invention is to provide an improved combination of cooperating elements in a reel seat.

A further object of the invention is to provide an improved reel seat construction including related elements cooperable to firmly position and secure a reel assembly on and relative to said seat, to facilitate removal and replacement of reel assemblies relative to said seat, and so designed as to minimize sticking, freezing, or binding of movable elements so frequently found with disadvantage in conventional reel seat constructions.

My invention consists in the construction, arrangement and combination of elements hereinafter set forth, pointed out in my claim and illustrated by the accompanying drawing, in which—

Figure 1:
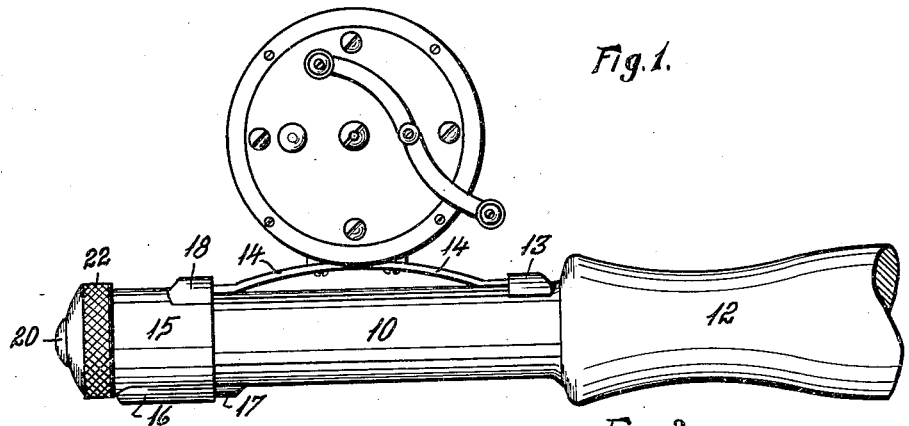
Figure 2:
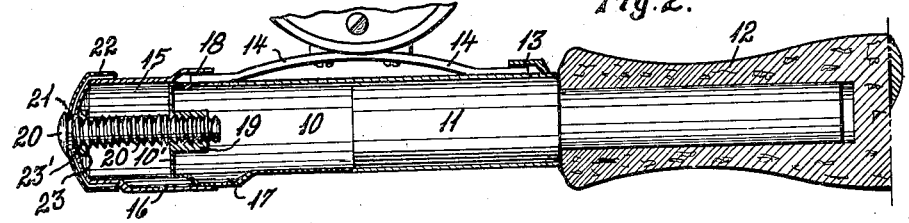
Figure 3:
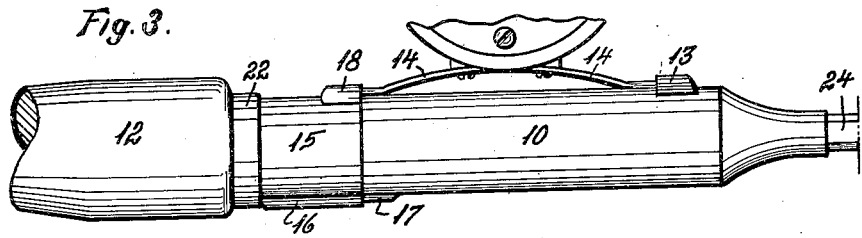
Figure 4:
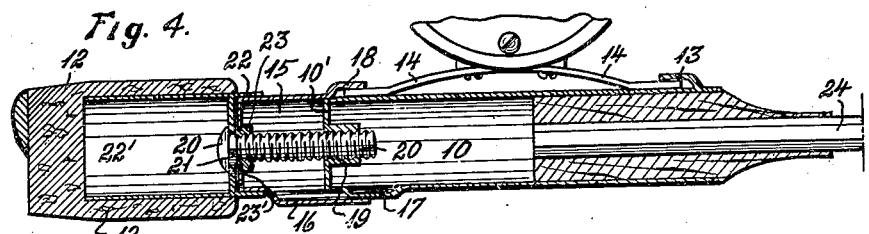
Figure 5:
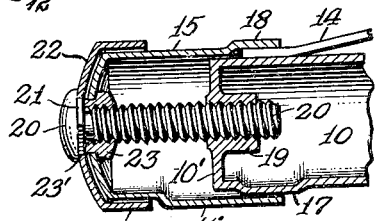

Figure 1 is a side elevation of the improved reel seat as operatively combined with a fly rod. Figure 2 is a longitudinal section axially of the showing of Figure 1. Figure 3 is a view similar to Figure 1 showing the improved reel seat as modified for adaptation to a bait casting rod. Figure 4 is a longitudinal section axially of the showing of Figure 3. Figure 5 is a fragmentary, detail section, on an enlarged scale, axially of the movable reel seat elements shown in Figure 2.

In the construction of the improvement as shown in Figures 1 and 2, the reel seat proper is illustrated as a substantially cylindrical, tubular member 10, formed of any suitable material, such as sheet metal, in any desired manner and arranged with one end open and its other end closed by means of a disc or plate 10'. When combined with a fly rod, the member 10 is suitably secured on and in axial alignment with the butt end of the rod with its closed end remote from said rod, one mounting arrangement being illustrated as comprising a cylindrical, plug-like, butt extension 11 aligned with and projecting axially from the grip portion 12 of a conventional rod construction, which extension 11, is adapted to be received and fit snugly within the open end of the member 10 and be secured thereto in any suitable or desired manner. Adjacent the open end of the member 10, a suitable clip 13 is formed on or fixed securely to the exterior surface of said member and projects radially therefrom, said clip being arranged to form a pocket opening toward the closed end of said member and adapted to slidingly receive one end of a conventional reel base 14.

A thimble 15 is formed with a cylindrical portion arranged to telescope over the closed end of the member 10 and is mounted for longitudinal reciprocation relative to said closed end of the member 10 and held against rotation thereon by means of a longitudinally-disposed offset rib 16 engaging about and registering with a lug 17 offset radially from the member 10 adjacent its closed end. The thimble 15 is provided with a radial offset 18 in its free margin positioned to align with the clip 13 when the rib 16 and lug 17 are engaged, said offset 18 cooperating with the member 10 to form a pocket wherein an end of the reel base 14 may be received and held. To adjust the thimble 15 longitudinally of the member 10 and to hold said thimble in its adjusted position, an internally-threaded boss 19 is provided in fixed relation on and extending interiorly within the member 10 from the closure element 10', which boss receives and threadedly cooperates with a screw element 20 disposed axially within the thimble 15. The outer end of the element 20 is provided with a terminal head and an angular shoulder 21 immediately adjacent said head, and a cup-like adjusting member 22 is formed with an angular central opening adapted to snugly receive the shoulder 21 and is thereby mounted in closely telescoping relation with and about the outer end of the thimble 15. To operatively connect the thimble 15 and screw element 20, a nut 23 is formed with an annular shoulder 23' and is threaded on the element 20 to permit engagement of said shoulder against the angular shoulder 21, said annular shoulder 23' engaging through a circular aperture formed in the outer end of said thimble 15, so that, the element 20, member 22 and nut 23 being engaged for simultaneous rotation, any rotation of the element 20 effects only axial travel of the thimble 15 relative to the member 10.

With the construction and arrangement of elements hereabove described it is obvious that rotation of the element 20 through the agency of the member 22 acts to move the thimble 15 longitudinally of the member 10 while maintaining the clip 13 and offset 18 in longitudinal alignment, thus increasing or decreasing the linear distance between the base-receiving pockets formed by said elements 13 and 18, opposite rotation of the member 22 serving, naturally, to reverse the direction of travel of said thimble on the member 10, so that the member 22 may be manipulated to either clamp or release a reel base 14 relative to the seat provided by the member 10.

In the modification of the improvement according to Figures 3 and 4, the essential elements of the device are functionally identical with those hereabove described, the only difference being a slight structural change necessary to adapt the improvement to a fishing rod wherein the reel seat is mounted forwardly of the grip. When it is desired that the grip 12 be on the butt end of the rod, the member 22 is provided with a suitable extension 22' projecting axially therefrom toward the rod butt, to which extension the grip 12 is suitably secured so that rotation of the latter effects rotation of the member 22 to the end and for the purpose above described. As shown in Figure 4, the fishing rod itself, indicated at 24, may be seated directly in the open end of the member 10 when the grip 12 is positioned at the butt end of the assembly, but it will be obvious that other specific arrangements of rod and grip may be had in combination with the improved reel seat without in any way affecting the essential construction and operation of the improvement.

It is to be noted that the improved reel seat has many practical advantages, among which may be mentioned the range of adjustment possible in the combination to accommodate reel bases of various sizes, the positive locking effect of the screw element 20 in all of its adjusted positions, and the smooth, compact exterior presented by the novel combination of elements.

Since the specific form, construction and arrangement of the elements shown and described may be varied and modified without departing from the spirit of the invention, I wish to be understood as being limited solely by the scope of the appended claim rather than by any details of the illustrative showing and foregoing description.

I claim as my invention—

A reel seat comprising a rigid, cylindrical barrel portion formed with one open and one closed end, a retaining clip fixed to and adjacent the open end of said barrel portion, a thimble freely slidable in non-rotatable, telescoping relation with the closed end of said barrel portion, a second retaining clip carried by said thimble in spaced opposition and longitudinal alignment with said first clip, a cup-like thumb-nut in freely rotatable telescoping relation with the outer end of said thimble and having a non-circular shaped aperture centrally thereof, a threaded stem formed with an angular shoulder operatively engaging the aperture of said thumb-nut, a circular central aperture in said thimble traversed by said stem, a nut on said stem within said thimble, an annular shoulder on said nut adapted to loosely engage within the circular aperture of said thimble, whereby the latter is mounted for free rotation on and held against longitudinal travel relative to said stem, and an internally-threaded boss centrally of the closed end of said barrel portion and threadedly engaged by said stem.

ROBERT HOLDING.